(12) United States Patent
Kang

(10) Patent No.: US 9,982,913 B2
(45) Date of Patent: May 29, 2018

(54) HOT AIR BLOWER

(71) Applicant: In Won Kang, Seoul (KR)

(72) Inventor: In Won Kang, Seoul (KR)

( * ) Notice: Subject to any disclaimer, the term of this patent is extended or adjusted under 35 U.S.C. 154(b) by 85 days.

(21) Appl. No.: 14/898,185

(22) PCT Filed: Jun. 12, 2014

(86) PCT No.: PCT/KR2014/005146
§ 371 (c)(1),
(2) Date: Dec. 14, 2015

(87) PCT Pub. No.: WO2014/200271
PCT Pub. Date: Dec. 18, 2014

(65) Prior Publication Data
US 2016/0146503 A1 May 26, 2016

(30) Foreign Application Priority Data

Jun. 13, 2013 (KR) ........................ 10-2013-0067975

(51) Int. Cl.
*F24H 3/00* (2006.01)
*F24H 9/02* (2006.01)
*F24H 3/02* (2006.01)
*F24H 3/04* (2006.01)

(52) U.S. Cl.
CPC ............... *F24H 9/02* (2013.01); *F24H 3/006* (2013.01); *F24H 3/0488* (2013.01); *F24H 3/02* (2013.01); *F24H 3/0417* (2013.01)

(58) Field of Classification Search
CPC ............... F24H 3/00; F24H 9/02; F24H 3/006
USPC ...................... 126/114, 244, 116 R
See application file for complete search history.

(56) References Cited

U.S. PATENT DOCUMENTS

| | | | | |
|---|---|---|---|---|
| 7,628,102 | B2 * | 12/2009 | Kamiya | B23D 59/006 125/13.01 |
| 2004/0245247 | A1 * | 12/2004 | Rawal | H05B 6/642 219/757 |
| 2006/0207948 | A1 * | 9/2006 | Hacker | B01D 29/055 210/791 |
| 2015/0300343 | A1 * | 10/2015 | Chou | F04B 39/10 417/374 |
| 2015/0352241 | A1 * | 12/2015 | Furner | A61L 9/122 422/105 |

FOREIGN PATENT DOCUMENTS

| | | | | |
|---|---|---|---|---|
| JP | 2000274964 A | * | 10/2000 | ............... F28C 1/12 |
| KR | 20-1993-0001051 Y1 | | 3/1993 | |
| KR | 20-1997-0005182 Y1 | | 5/1997 | |
| KR | 10-2004-0081968 A | | 9/2004 | |
| KR | 10-1245516 B1 | | 3/2013 | |

* cited by examiner

*Primary Examiner* — Gregory Huson
*Assistant Examiner* — Nikhil Mashruwala
(74) *Attorney, Agent, or Firm* — STIP Law Group, LLC

(57) ABSTRACT

A hot air blower, according to the present invention, which can have the advantage of allowing the inside of a combustion body assembly (40) to be easily opened during a failure since the hot air blower has a structure for maintaining a coupled state when a service cover (80) is closed, and for rotating to an upper side only when the service cover (80) is opened.

4 Claims, 13 Drawing Sheets

HOT AIR BLOWER

CROSS-REFERENCE TO RELATED APPLICATIONS

This application is the U.S. National Phase under 35 U.S.C. § 371 of International Application No. PCT/KR2014/005146 filed on Jun. 12, 2014, which in turn claims the benefit of Korean Application No. 10-2013-0067975, filed on Jun. 12, 2013, the disclosures of which are incorporated by reference into the present application.

FIELD OF THE INVENTION

The present invention relates to a hot air blower, and in particular to a hot air blower wherein a service cover is easy to open or close.

DESCRIPTION OF THE RELATED ART

A hot air blower in general uses electricity or fuel as a heating source. In case where the electricity is used, the hot air blower may be configured by an electricity heating method wherein a heater or a heating wire formed of coil is provided inside a main body, and sucked gas is heated to a relatively high temperature in such a way to supply electricity, and the heated air is discharged to the outside using an air blowing fan. In case of the fuel type, fuel is combusted inside a combustion chamber, and a high temperature combustion air is discharged to the outside using an air blowing fan.

The hot air blower of an electricity heating type among the above hot air blowers is mainly used to warm the indoor space at most of homes. The hot air blower of the combustion heating type is usually used when it needs to cure concrete or supply heat to a stable, a chicken house, a cowshed, etc.

The hot air blower disclosed in the Korean patent number 10-2005-0037864 which is adapting the conventional combustion heating type includes a hot air blower main body having a fuel tank at a lower side thereof; a combustion chamber formed from the top of the fuel tank to the front of the hot air blower main body; a burner module which is installed at a rear end of the combustion chamber and has a spray nozzle for spraying fuel and an ignition plug; a pump which is connected to the burner module via a fuel supply line so as to generate a predetermined pressure and supply fuel; an air blowing fan which is able to blow the air toward the combustion chamber; and a driving motor which is able to rotate the air blowing fan.

In such a hot air blower, when a user rotates the air blowing fan by supply electricity through the operation of an on/off switch, the air can be sucked through an air suction port formed on the backside of the hot air blower main body, and at the same time, pressure is generated in the pump which operates in sync with the driving motor.

The pressure generated in the pump may allow the fuel to be sucked from the fuel tank to the burner module via the fuel supply line, and the sucked fuel will be sprayed via a spray nozzle of the burner module and is mixed with the air sucked into the burner module and is ignited by an ignition plug provided at the burner module and then is combusted.

In the combustion chamber, the combustion of the fuel can be promoted by the air which is blown in by the air blower via an air inlet port formed at the rear of the combustion chamber.

The air heated inside the combustion chamber by a combustion heat generated while the fuel is ignited and combusted in the above manner will flow turbulent and will be discharged to the outside via an air discharge port at the front of the combustion chamber.

PRIOR ART TECHNICAL DOCUMENT

Patent Documents

Korean patent publication number 10-2005-0037864

SUMMARY OF THE INVENTION

Disclosure of the Invention

Accordingly, it is an object of the present invention to provide a hot air blower wherein a service cover is easy to open and close.

Technical Solution

To achieve the above objects, there is provided a hot air blower which is able to discharge via a discharge port the heat generated by combusting fuel, which may include, but is not limited to, a tank 10; and a combustion body assembly 40 which is installed on the top of the tank 10 and includes a suction port 31 and a discharge port 32 in an axial direction, wherein the combustion body assembly 40 includes a lower body 41 which is fixed at the tank 10; an upper body 42 which is engaged to the top of the lower body 41 and is disposed at the discharge port 32; and a service cover 80 which slides with respect to the lower body 41 and is engaged with the lower body 41 and relatively rotates with respect to the lower body 41 and opens or closes a service opening 45 formed at the top of the lower body 41.

The service cover 80 may include, but is not limited to, a service body 81 which is able to open or close the service opening 45; and a slide rotation unit 82 which is disposed at the service body 81 and allows the service body 81 to slide and rotate with respect to the lower body 41, wherein the lower body 41 includes a slide rail 46 which has a slide groove 47a in which the slide rotation unit 82 is inserted and slides; and a rotation space 48 which is formed between the slide rails 46 and is formed not interfering with the slide rotation unit 82 in order for the slide rotation unit 82 to relatively rotate with respect to the lower body 41.

The slide rail 46 may include, but is not limited to, first and second sliders 47b and 47c which are disposed for the slide groove 47a to be formed; and a rotation groove 47d which defines a rotation center of the slide rotation unit 82.

The slide rotation unit 82 may include, but is not limited to, a rotation unit 82d which is inserted in the slide rail 46 and defines a rotation axis of the service body 81; and a connection unit 82a which interconnects the rotation unit 82d and the service body 81.

There may be further provided a slide fixing unit 83 which is formed at the service body 81 and is inserted into and engaged to the upper body 42 when the service cover 80 slides.

The service cover may include, but is not limited to, a service body which is able to open or close the service opening; a slide rotation unit which is disposed at the service body and is able to rotate hinge-engaged with the lower body and slides along the lower body; and a boundary fixing unit which is disposed at the opposite side of the slide rotation unit with respect to the service body and is fixedly inserted into the lower body during the slide movement, wherein the lower body includes a rotation space in which the slide rotation unit is able to slide and rotate; and a lower body fixing unit which causes an inter-hooking with the boundary fixing unit when the service cover slides.

The lower body fixing unit includes an engaging protrusion 149a which is protruding toward the boundary fixing unit and causes an inter-insertion and engagement with the boundary fixing unit during the slide movement thereof, and the boundary fixing unit 184 includes a slide hole 184a through which the engaging protrusion 149a passes, thus guiding a slide movement direction of the engaging protrusion 149a.

Advantageous Effects

Since the hot air blower according to the present invention, which can have the advantage of allowing the inside of a combustion body assembly (40) to be easily opened during a failure since the hot air blower has a structure for maintaining a coupled state when a service cover (80) is closed, and for rotating to an upper side only when the service cover (80) is opened.

The service cover 80 of the hot air blower according to the present invention may slide as a connection unit 82a is inserted into a slide groove 47a formed at a slider 47 and may rotate only when the connection unit 82a positions in a rotation space 48. To this end, it can remain engaged stably with a lower body 41.

BEST MODES FOR CARRYING OUT THE INVENTION

The present invention will be described with reference to the accompanying drawings.

While describing the present invention, in the event that related known functions or configurations are considered as rendering the subject matters of the present invention unclear, the detail descriptions thereon will be omitted. It is noted that if the indicated portions are different even though the terms are same, it means that the reference numbers thereof are not matched.

The terms hereinafter are set in consideration of the functions in the present invention. Such terms are subject to changes based on the intention or customs of a user, for example, a tester and a measuring person. So, their definitions should be made based on the whole contents of the present specification.

The terms, for example, "first", "second", etc. in the present specification may be used to represent various components, and such components are not limited to the terms. The above terms may be should be used only for the purpose to distinguish one component from another component. For example, a first component may be named as a second component unless such a switch is out of the scope of the right of the present invention. Similarly, the second component may be named as a first component. The terms "and/or" may be translated as including a combination of a plurality of recited components or a predetermined component among a plurality of the recited component.

The terms used in the present specification are intended as describing a specific exemplary embodiment, not to limit the present invention. A singular form should be interpreted as including a plural meaning unless otherwise meant in the context.

Unless otherwise stated, all the terms including technical or scientific terms have the same meaning as the meaning that a person having ordinary skill in the art can understand. The terms in general defined in an ordinary dictionary should be interpreted as having the meanings matching with the meaning in the contexts of the related technology, and unless otherwise designed clearly in the present application, such terms are not interpreted as ideal or superficial meanings.

The expression like "if a predetermined portion 'includes' a predetermined component" means that another component may be further included, not excluding the another component unless otherwise stated thereon.

Figure 1:
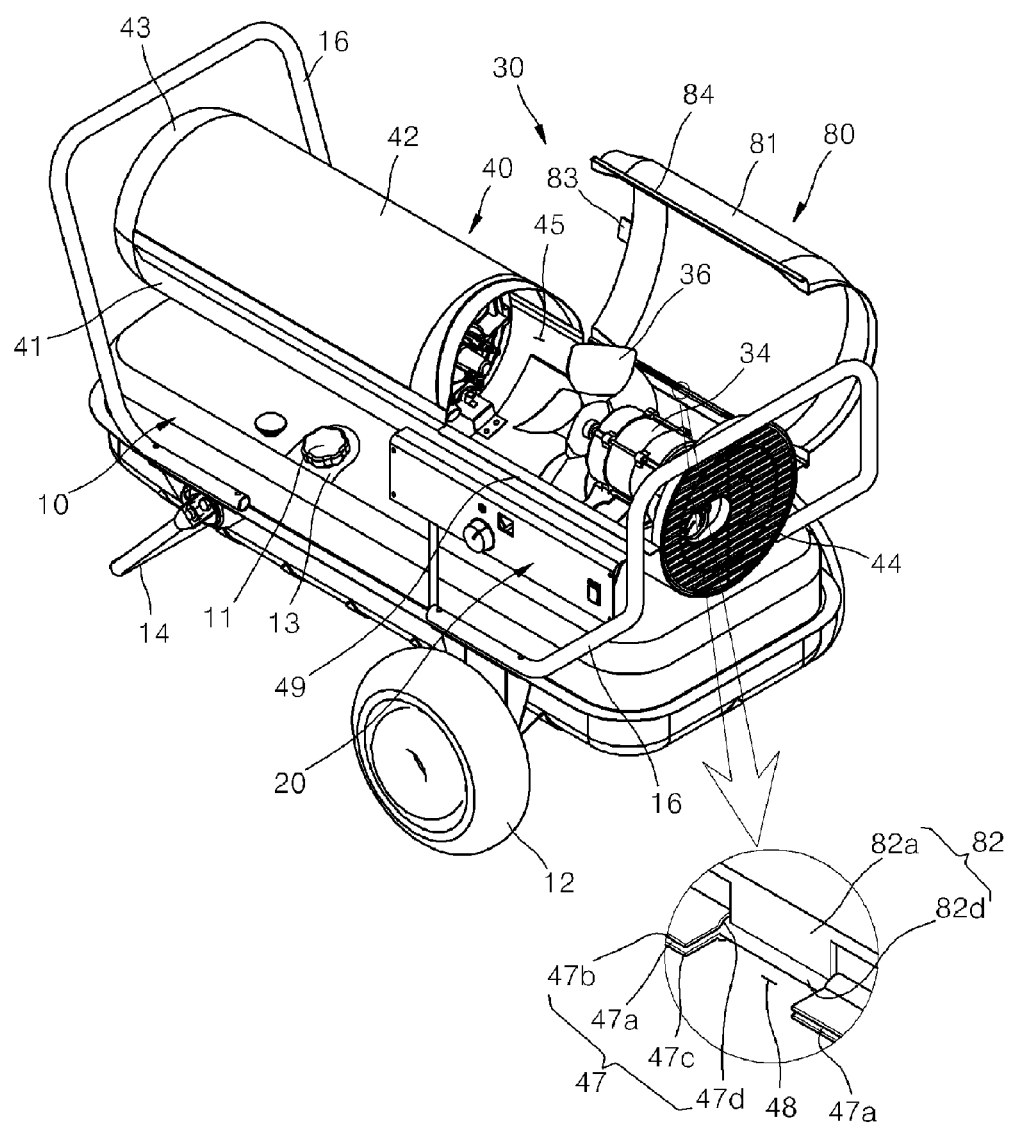
FIG. 1 is a perspective view illustrating a state where a service cover of a hot air blower is open according to a first exemplary embodiment of the present invention.
Figure 2:
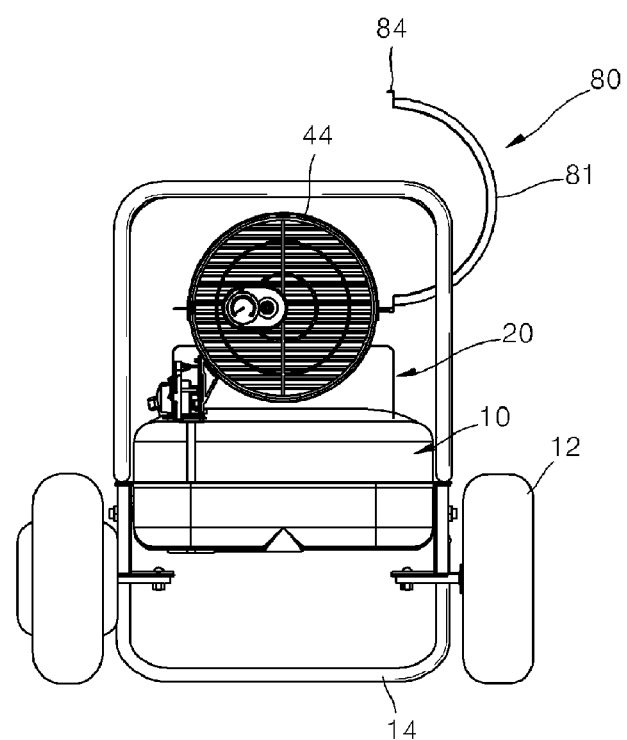
FIG. 2 is a front view illustrating a configuration in FIG. 1.
Figure 3:
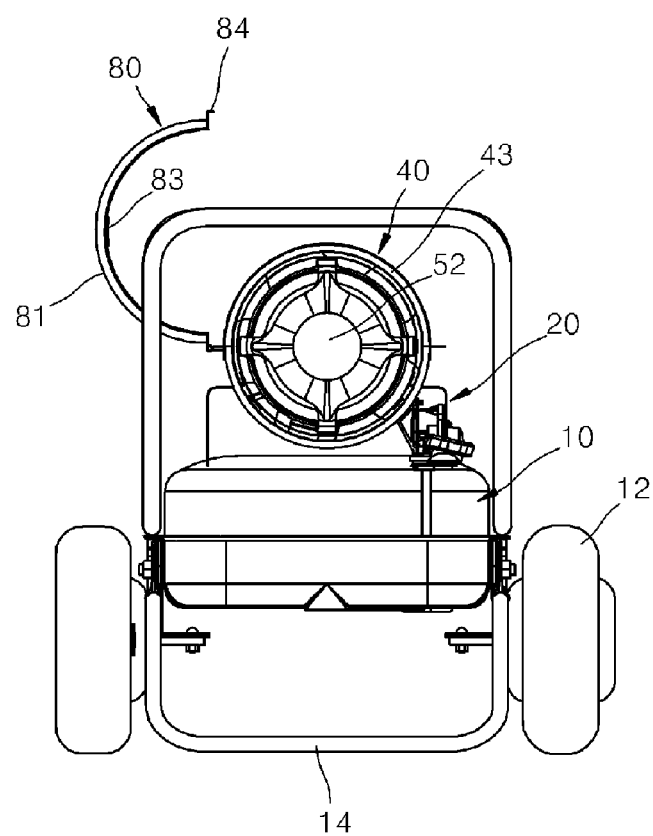
FIG. 3 is a rear view illustrating a configuration in FIG. 1.
Figure 4:
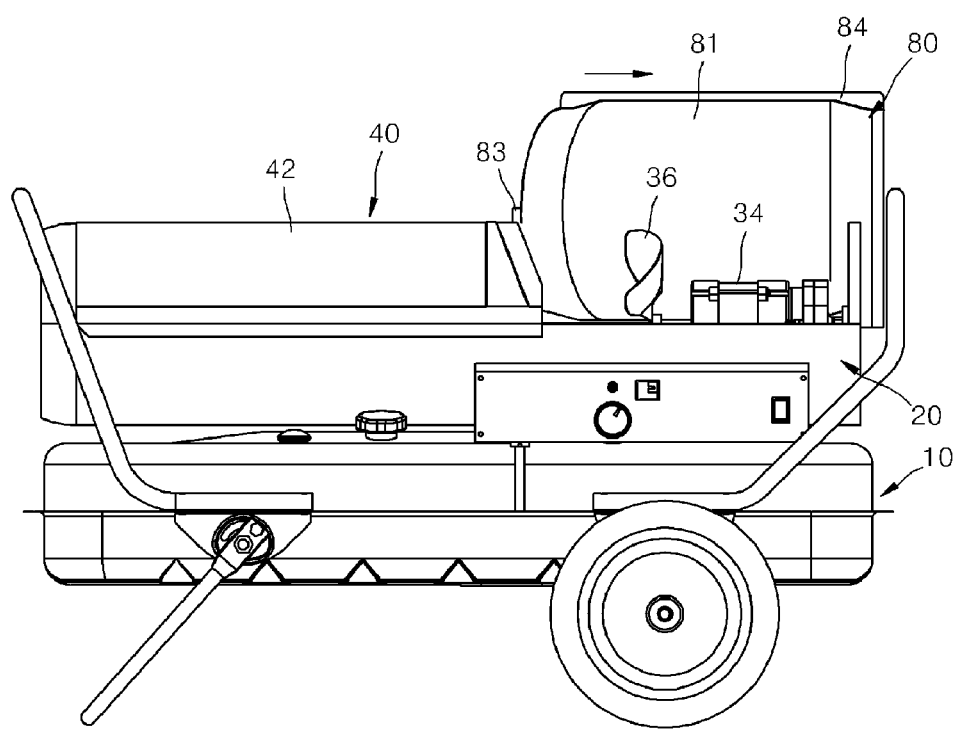
FIG. 4 is a left side view illustrating a configuration in FIG. 1.
Figure 5:
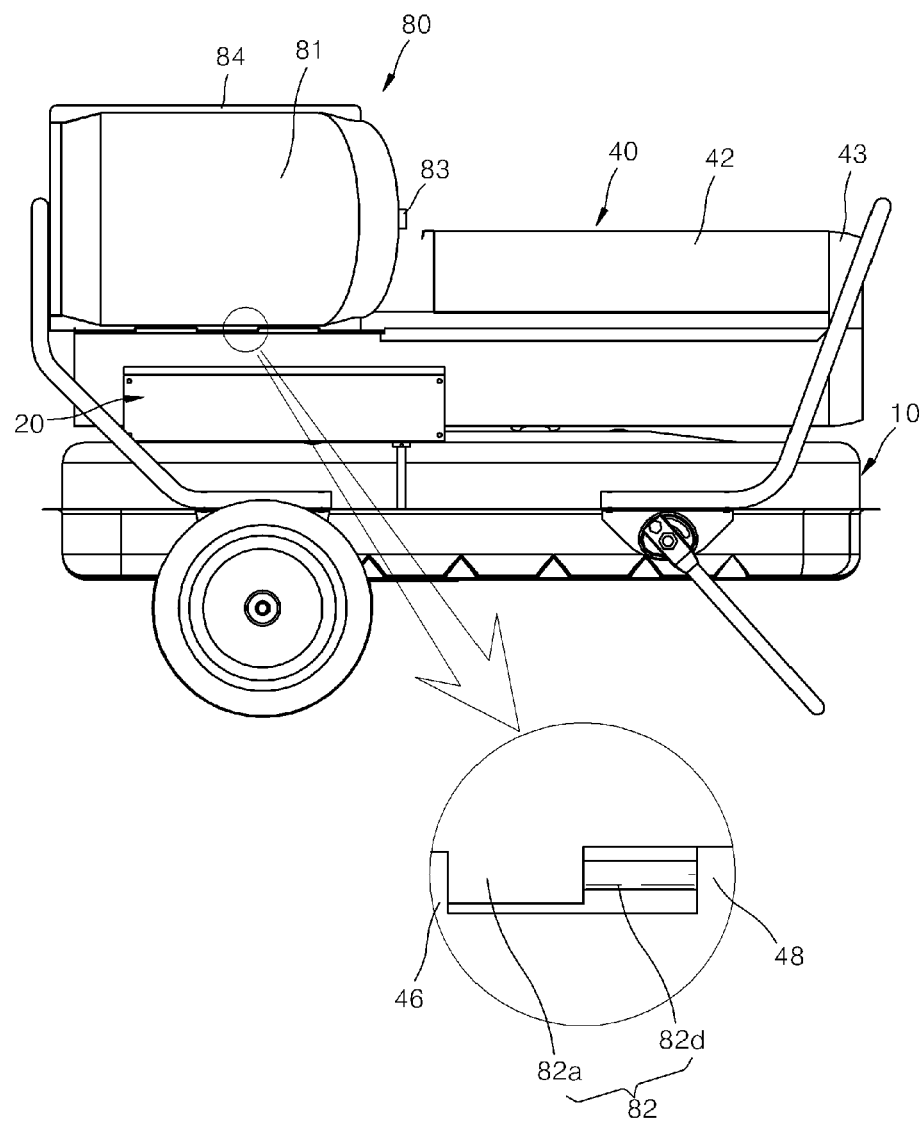
FIG. 5 is a right side view illustrating a configuration in FIG. 1.
Figure 6:
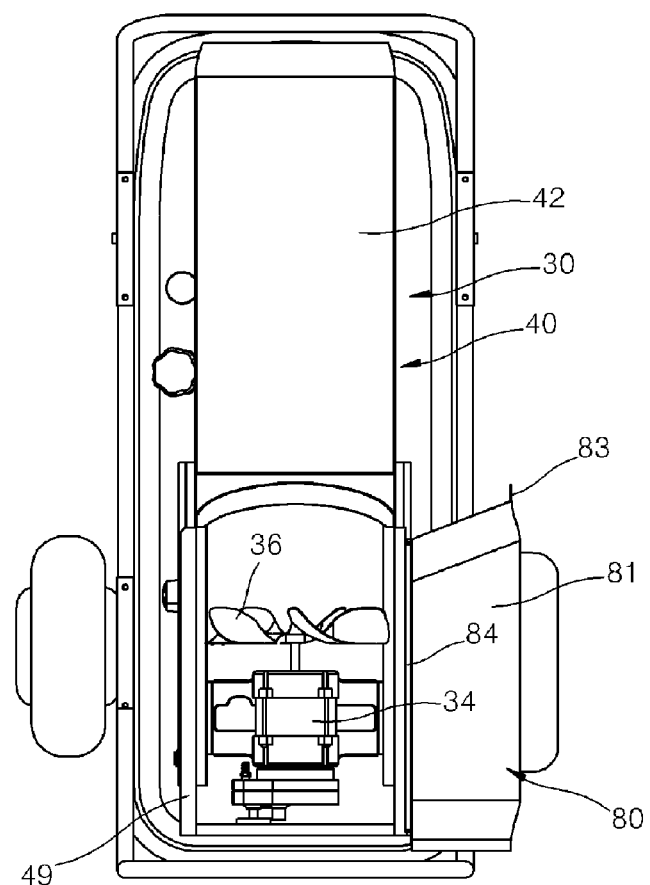
FIG. 6 is a plane view illustrating a configuration in FIG. 1.
Figure 7:
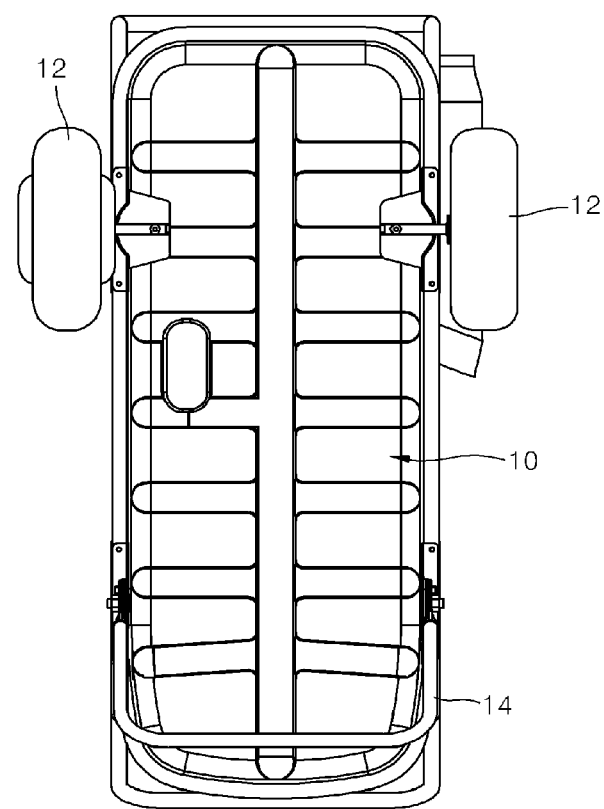
FIG. 7 is a bottom view illustrating a configuration in FIG. 1.
Figure 8:
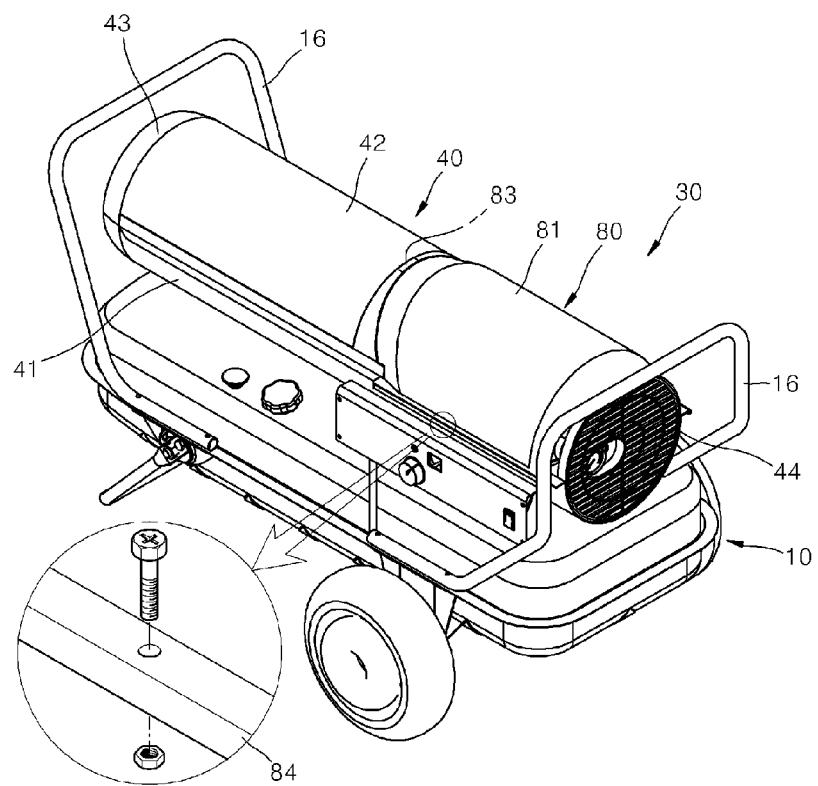
FIG. 8 is a perspective view illustrating a state where a service cover of a hot air blower is closed according to a first exemplary embodiment of the present invention.
Figure 9:
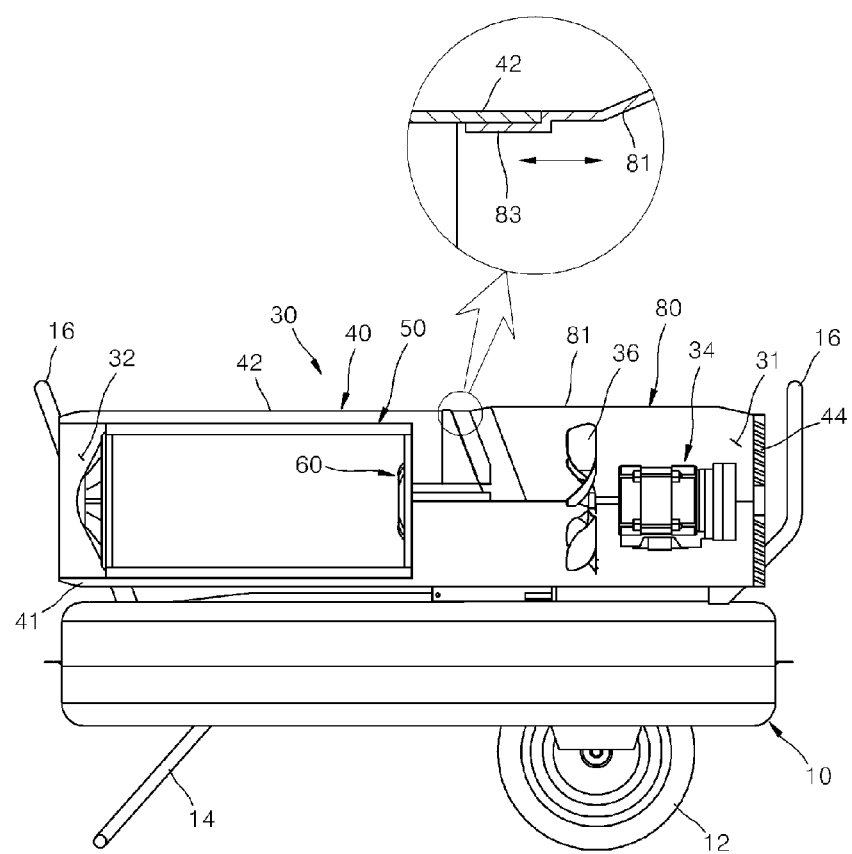
FIG. 9 is a left side cross sectional view illustrating the inside of a configuration in FIG. 8.
Figure 10:
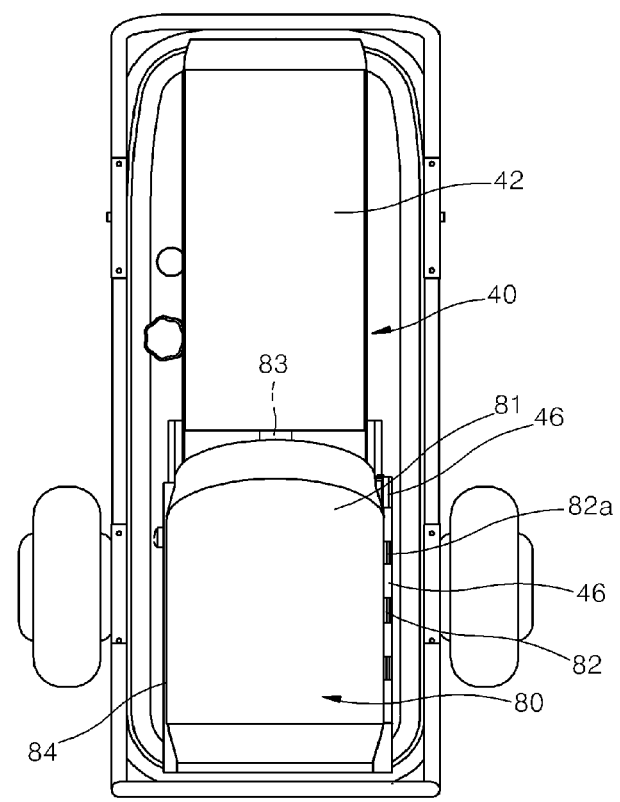
FIG. 10 is a plane view illustrating a configuration in FIG. 8.
Figure 11:
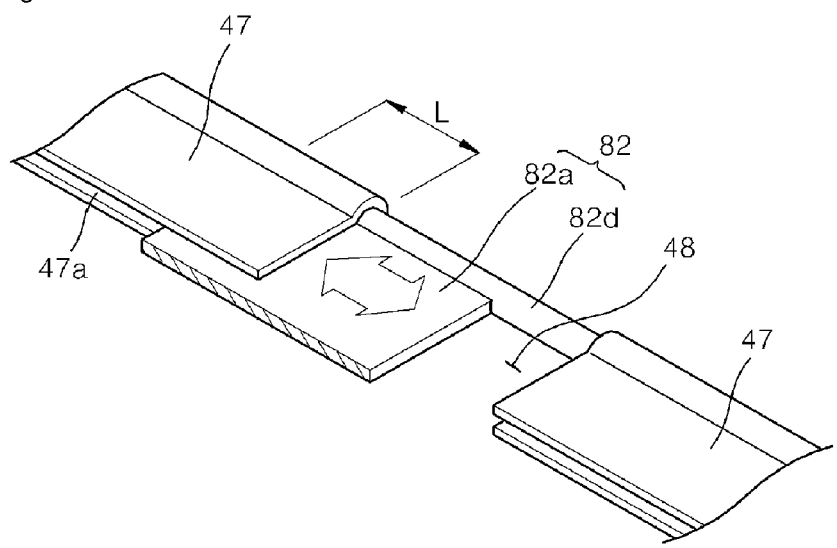
FIG. 11 is a view for describing an operation 1 of a slide rotation unit according to a first exemplary embodiment of the present invention.
Figure 12:
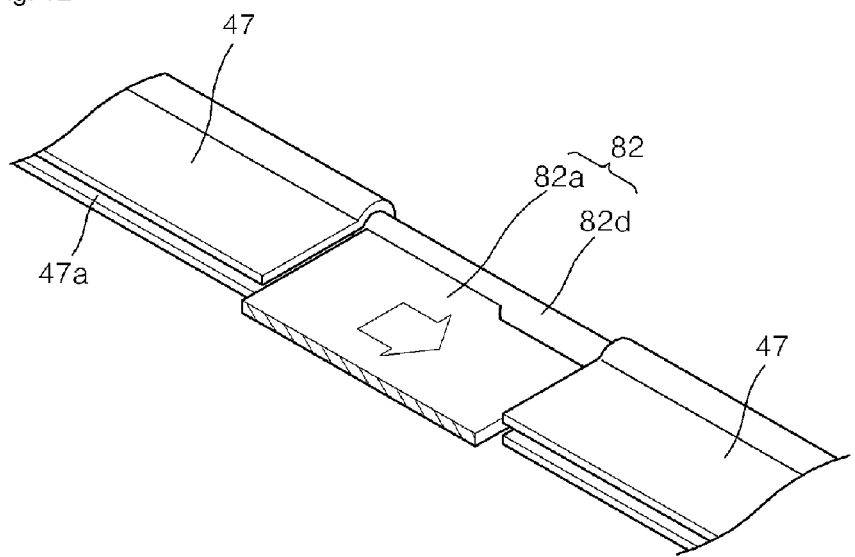
FIG. 12 is a view for describing an operation 2 of a slide rotation unit according to a first exemplary embodiment of the present invention.
Figure 13:
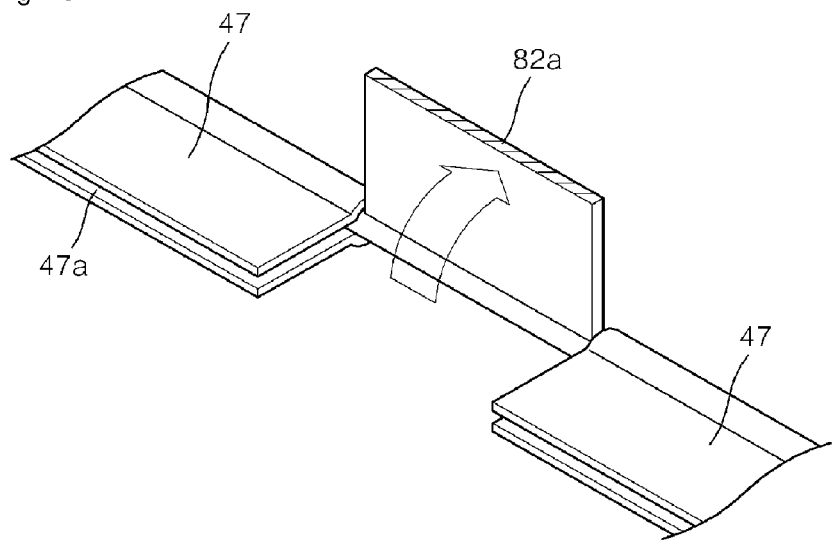
FIG. 13 is a view for describing an operation 3 of a slide rotation unit according to a first exemplary embodiment of the present invention.

FIG. 1 is a perspective view illustrating a state where a service cover of a hot air blower is open according to a first exemplary embodiment of the present invention. FIG. 2 is a front view illustrating a configuration in FIG. 1. FIG. 3 is a rear view illustrating a configuration in FIG. 1. FIG. 4 is a left side view illustrating a configuration in FIG. 1. FIG. 5 is a right side view illustrating a configuration in FIG. 1. FIG. 6 is a plane view illustrating a configuration in FIG. 1. FIG. 7 is a bottom view illustrating a configuration in FIG. 1. FIG. 8 is a perspective view illustrating a state where a service cover of a hot air blower is closed according to a first exemplary embodiment of the present invention. FIG. 9 is a left side cross sectional view illustrating the inside of a configuration in FIG. 8. FIG. 10 is a plane view illustrating a configuration in FIG. 8. FIG. 11 is a view for describing an operation 1 of a slide rotation unit according to a first exemplary embodiment of the present invention. FIG. 12 is a view for describing an operation 2 of a slide rotation unit according to a first exemplary embodiment of the present invention. FIG. 13 is a view for describing an operation 3 of a slide rotation unit according to a first exemplary embodiment of the present invention.

As illustrated therein, the hot air bower according to the present embodiment may include, but is not limited to, a tank 10; a wheel 12 fixed at a rear side of the tank 10; a support unit 14 which is fixed at a front side of the tank 10 and is able to support weight; a handle 16 which is fixed at the tank 10 and extends upward; a combustion module 30 which is installed at an upper portion of the tank 10; and a control module 20 disposed between the combustion module 30 and the tank 10.

The tank 10 is suitable to store fuel and may include an injection port (not illustrated) at one side to inject fuel, and a stopper 11 is provided to open and close the injection port.

The injection port is formed on the top of the tank 10. For the sake of an easier injection of the fuel by the user, an injection port surface 13 where the injection port is formed has an inclination surface which is inclined in the direction of the injection by the user.

The control module 20 is provided so as to control the combustion module 30. The combustion quantity, the discharge temperature, the intensity discharging wind, etc. of the combustion module 30 can be controlled.

Each component of the control module 20 is a technology known to a person having ordinary skill in the art, so the descriptions thereon will be omitted.

The combustion module 30 may include, but is not limited to, a combustion body assembly 40 wherein a suction port 31 and a discharge port 32 are formed in an axial direction; a motor 34 which is disposed inside the combustion body assembly 40 and is driven by electric power supplied thereto; a fan 36 which is connected to the motor 34 and rotates; a combustion housing 50 which is disposed at the sides of the discharge port 32 with respect to the fan 36; and a burner assembly 60 which is installed at the combustion housing 50 and is able to combust the fuel.

The combustion body assembly 40 is formed in a cylindrical shape in whole, and may include a suction port 31 at one side thereof, and a discharge port 32 at the other side thereof. In the present exemplary embodiment, a suction grill 44 is formed at the suction port 31.

The motor 34 will operate in accordance with a control signal from the control module 20 and is disposed at the side of the suction port 31 in the present exemplary embodiment.

The fan 36 is engaged to the motor 34 and rotates and may allow to suck air from the suction port 31 and then may discharge the air heated in the combustion housing 50 to the side of the discharge port 32.

The combustion housing 50 is formed in a cylindrical shape in whole, and the burner assembly 60 is installed at one side where the fan 36 positions.

The burner assembly 60 is able to generate heat by combusting fuel in the inside of the combustion housing 50.

A combustion cover 52 may be disposed at the other side of the combustion housing 50 so as to prevent the combusted flame from being directly discharged toward the discharge port 32. The combustion cover 52 is disposed inside the combustion body assembly 40.

Meanwhile, the combustion body assembly 40 may be formed in a cylindrical shape in whole and may include, but is not limited to, a lower body 41 fixed at the tank 10; an upper body 42 which is engaged to the top of the lower body 41 and is disposed at the side of the discharge port 32; a service cover 80 which is engaged to the top of the lower body 41 and is disposed at the side of the suction port 31, thus partially opening and closing the top the lower body 41; a discharge port frame 43 engaged to the discharge ports 32 of the lower body 41 and the upper body 42; and a suction grill 44 installed at the suction port 31.

The lower body 41, the upper body 42 and the service cover 80 are engaged with each other, thus forming a cylindrical shape in whole.

The discharge port frame 43 is engaged to the discharge sides of the upper body 42 and the lower body 41, and the recovery force of the lower body 41 and the upper body 42 can be inhibited with the aid of such an engagement, while maintaining a cylindrical shape of the lower body 41 and the upper body 42.

The suction grill 44 is installed at the side of the suction and is disposed between the lower body 41 and the service cover 80 and will provide a flow path through which air can be inputted into the inside of the combustion body assembly 40 during the rotation of the fan 36.

Inside the combustion body assembly 40, the combustion housing 50, the fan 36 and the motor 34 are arranged in a row. A service opening 45 is formed, which will open when the service cover 80 rotates. It may be configured in such a way that the fan 36 and the motor 34 are exposed at the inner side when the service cover 80 is open.

The service cover 80 may include, but is not limited to, a service body 61 for opening and closing the service opening 45; a slide rotation unit 82 which is disposed at the service body 81 and may allow the slide movement and rotation of the service body 81 with respect to the lower body 41; a slide fixing unit 83 which is formed at the service body 81 and is inserted into and engaged to the upper body 42 during the slide movement; and a boundary fixing unit 84 which is disposed at the opposite side of the slide rotation unit 82 with respect to the service body 81 and may contact close with the lower body 41.

A slide rail 46 which may allow the slide movement and rotation of a slide rotation unit 82 is formed at the lower body 41, and the slide rail 46 may include a slider 47 wherein a slide groove 46a is formed at an inner side; and a rotation space 48 formed between the sliders 47 so as to allow the rotation of the slide rotation unit 82.

The slider 47 may include first and second sliders 47b and 47c disposed for the slide groove 47a to be formed. In addition, a rotation groove 47d is formed at the slider 47 so as to define the rotation center of the slide rotation unit 82.

The service body 81 is formed in a cylindrical shape. The slide fixing unit 83 is formed protruding toward the upper body 42.

In the present exemplary embodiment, the slide fixing unit 83 is formed with a part thereof protruding from the step of the service body 81, but different from the above present exemplary embodiment, it will be fine if the whole portions of the step of the service body 81 are inserted into and engaged to the upper body 42.

The slide rotation unit 82 is able to slide along the slide rail 46 and may rotate as the interference with the slide rail 46 is removed when the slide rotation unit 82 positions in the rotation space 48 and may include a rotation unit 82d which is inserted into the slide rail 46 and forms a rotation axis of the service body 81; and a connection unit 82a which may interconnect the rotation unit 82d and the service body 81.

The rotation unit 82d may be inserted into the rotation groove 47d and slide along the rotation groove 47d and may rotate about the rotation groove 47d.

The connection unit 82a may slide along the slide groove 47a and may rotate about the rotation unit 82d without any interference with the slider 47 when it positions in the rotation space 48.

To this end, the service cover 80 engaged to the slide rail 46 may slide along the slider 47, and when it positions in the rotation space 48, the service cover 80 will rotate about the rotation unit 82d, thus opening the service opening 45.

Meanwhile, a lower body fixing unit 49 corresponding to the boundary fixing unit 84 may be formed at the lower body 41. The boundary fixing unit 84 and the lower body fixing unit 49 are closely contacted and fixed using a fixing member, for example, a bolt or a screw.

The boundary fixing unit 84 is formed bent to cover the outer circumference of the lower body fixing unit 49. When it is engaged with the lower body fixing unit 49, it may be possible to enhance the sealing power of the service cover 80 which is able to block any communication of external air.

According to the present exemplary embodiment, since the service cover 80 is configured to rotate upward in a state where it is engaged with the lower body 41, it is effective that the inside of the combustion body assembly 40 can be easily opened when errors occur.

According to the present exemplary embodiment, since the service cover 80 may slide as the connection unit 82a is inserted into the slide groove 47a formed at the slider 47 and may rotate only when the connection unit 82a position in the rotation space 48, it is effective that the service cover 80 can maintain a reliably engaged state to the lower body 41.

More specifically, when the service cover 80 is engaged, the slider fixing unit 83 is inserted by a predetermined length L into the upper body 42, and the service cover 80 is fixed at the upper body 42, and the connection unit 82a can remain engaged into the slider 47, so the service cover 80 can remain engaged stably, thus enhancing sealing power.

Here, since the service cover 80 is made in an opening and closing structure, the air resistance by the fan 36 can be minimized only if it is configured closely contacting with the upper body 42 and the lower body 41 during the engagement. If any gap occurs between the service cover 80 and the upper body 42 during the engagement of the service cover 80, the heat from the combustion module 30 may emit to the outside, thus lowering efficiency, and the wind pressure of the air discharged to the discharge port 32 may lower.

Figure 14:
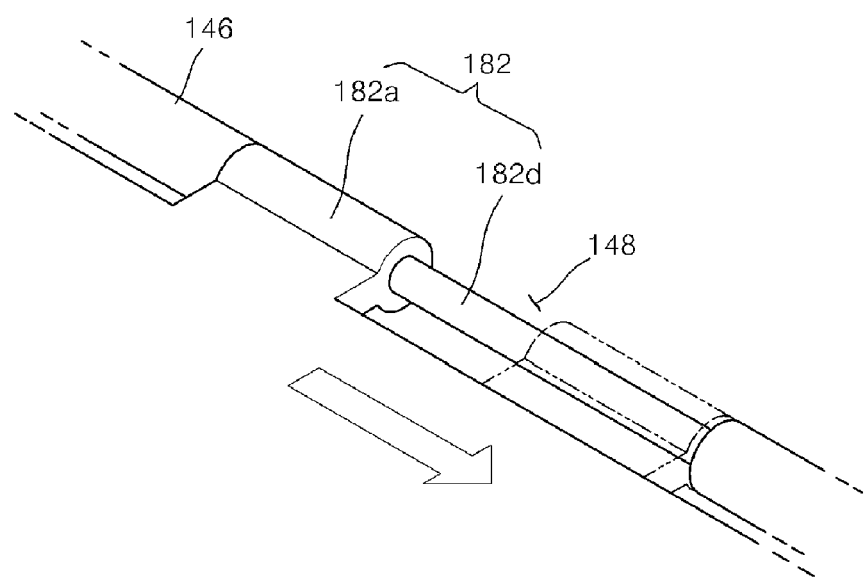
FIG. 14 is a perspective view illustrating a slide rotation unit according to a second exemplary embodiment of the present invention.
Figure 15:
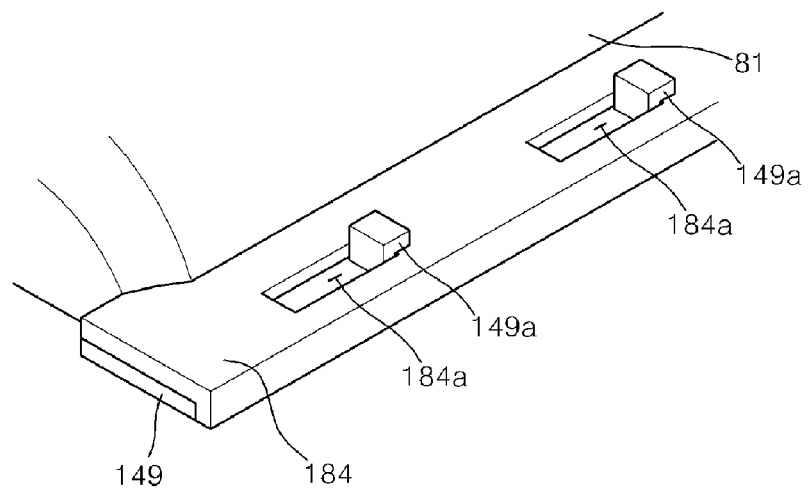
FIG. 15 is a view for describing an operation 1 of a boundary fixing unit according to a second exemplary embodiment of the present invention.
Figure 16:
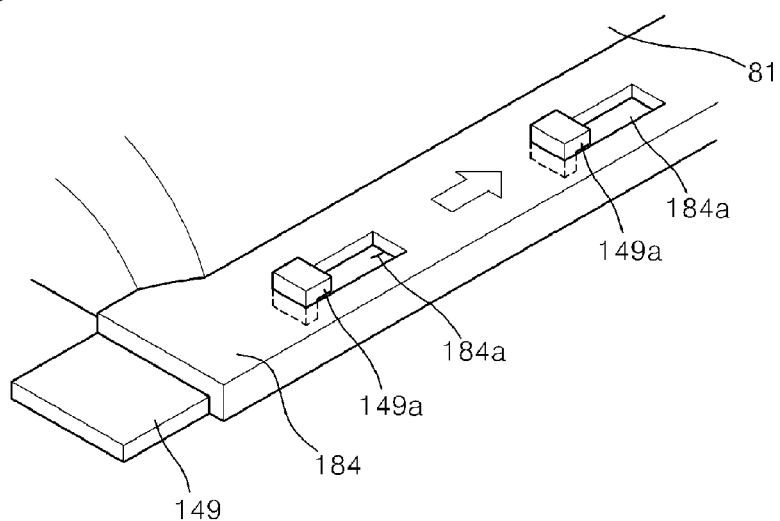
FIG. 16 is a view for describing an operation 2 of a boundary fixing unit according to a second exemplary embodiment of the present invention.

FIG. 14 is a perspective view illustrating a slide rotation unit according to a second exemplary embodiment of the present invention. FIG. 15 is a view for describing an operation 1 of a boundary fixing unit according to a second exemplary embodiment of the present invention. FIG. 16 is a view for describing an operation 2 of a boundary fixing unit according to a second exemplary embodiment of the present invention.

As illustrated therein, the slide rotation unit 182 is hinge-engaged to the lower body 41 and may include a rotation space 148 for the slide rotation unit 182 to move.

The lower body 41 may include a rotation space 148 for the slide rotation unit 182 to slide and rotate.

The slide rotation unit 182 may include a connection unit 182a connected to the service body 81; and a rotation unit 182d which is installed at the connection unit 182a and is engaged to the lower body 41 and may define a rotation axis of the service body 81.

The slide rotation unit 182 may be connected with the lower body 41 via the rotation unit 182d and may slide along the rotation unit 182d and may rotate about the rotation unit 182d.

The boundary fixing unit 184 and the lower body fixing unit 149 of the service cover 80 may have an engaging structure for the sake of inter-hooking during the slide movement so that they can fixedly engage with the lower body 41 when the service cover 80 slides.

For this, in the present exemplary embodiment, a slide groove 184a is formed at the boundary fixing unit 184, and at the lower body fixing unit 149, an engaging protrusion 149a is formed, which protrudes passing through the slide hole 184a and may allow an inter-insertion and engagement with the boundary fixing unit 184 during the sliding movement.

When the service cover 80 has slid toward the upper body 42, the engaging protrusion 149a is inserted into and engaged to the boundary fixing unit 184, and when the service cover 80 slides in the direction going far away from the upper body 42, the insertion and engagement between the engaging protrusion 149a and the boundary fixing unit 184 are removed.

Since the remaining configuration is same as the first exemplary embodiment, the detailed descriptions thereon will be described.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A hot air blower, comprising:
a tank; and
a combustion body assembly which is installed on the top of the tank and includes a suction port and a discharge port in an axial direction,
wherein the combustion body assembly includes:
a lower body which is fixed at the tank;
an upper body which is engaged to the top of the lower body and is disposed at the discharge port; and
a service cover which slides with respect to the lower body, is engaged with the lower body, relatively rotates with respect to the lower body, and opens or closes a service opening formed at the top of the lower body,
wherein the hot air blower is capable of discharging the heat generated by combusting fuel via the discharge port,
wherein the service cover includes:
a service body which is able to open or close the service opening; and
a slide rotation unit which is disposed at the service body and allows the service body to slide and rotate with respect to the lower body,
wherein the lower body includes:
a slide rail which has a slide groove in which the slide rotation unit is inserted and slides;
a slide fixing unit which is formed at the service body and is inserted into and engaged to the upper body when the service cover slides, and a rotation space which is formed between the slide rails and is formed not interfering with the slide rotation unit in order for the slide rotation unit to relatively rotate with respect to the lower body.

2. The hot air blower of claim 1, wherein the slide rail includes:

first and second sliders which are disposed for the slide groove to be formed; and a rotation groove which defines a rotation center of the slide rotation unit.

3. The hot air blower of claim 1, wherein the service cover includes:

a service body which is able to open or close the service opening;

a slide rotation unit which is disposed at the service body and is able to rotate hinge-engaged with the lower body and slides along the lower body; and a boundary fixing unit which is disposed at the opposite side of the slide rotation unit with respect to the service body and is fixedly inserted into the lower body during the slide movement, wherein the lower body includes:

a rotation space in which the slide rotation unit is able to slide and rotate; and a lower body fixing unit which causes an inter-hooking with the boundary fixing unit when the service cover slides.

4. The hot air blower of claim 3, wherein the lower body fixing unit includes an engaging protrusion which is protruding toward the boundary fixing unit and causes an inter-insertion and engagement with the boundary fixing unit during the slide movement thereof, and the boundary fixing unit includes a slide hole through which the engaging protrusion passes, thus guiding a slide movement direction of the engaging protrusion.

* * * * *